F. O. JANSSEN.
COVER FOR NURSING BOTTLES.
APPLICATION FILED FEB. 18, 1907.

978,892.

Patented Dec. 20, 1910.

Witnesses:
Wilhelm Brase.
Willi Casper

Inventor
Friedrich Oltmann Janssen
per
Gerson & Sachse
Attorneys

UNITED STATES PATENT OFFICE.

FRIEDRICH OLTMANN JANSSEN, OF HEMELINGEN, NEAR BREMEN, GERMANY.

COVER FOR NURSING-BOTTLES.

978,892.  Specification of Letters Patent.  Patented Dec. 20, 1910.

Application filed February 18, 1907. Serial No. 357,895.

*To all whom it may concern:*

Be it known that I, FRIEDRICH OLTMANN JANSSEN, a subject of the Emperor of Germany, residing at Hemelingen, near Bremen, in the Empire of Germany, have invented a new and useful Cover for Nursing-Bottles, of which the following is a specification.

This invention has for its object a cover for babies' nursing-bottles intended to prevent the spilling of the milk or the bottle getting broken or cracked.

The invention is illustrated on the accompanying drawing in which

Figure 1:
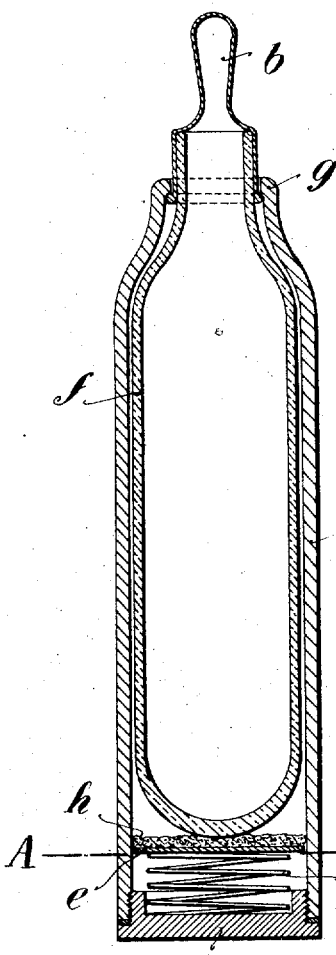
Figure 2:
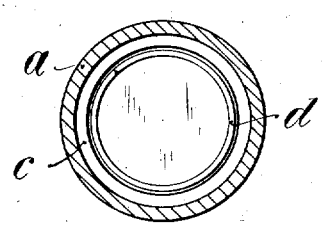

Figure 1 is a longitudinal section and Fig. 2 a cross section on the line A B, Fig. 1.

The cover or case $a$ is made of a suitable material. It is pushed upon the bottle in a manner that the nipple $b$ projects through an opening at the upper end. The opening is of such a size that its rim or edge $g$ touches the rim of the nipple provided with a rim $b'$. The lower end of the cover can be milk-tightly closed by a cover-plate $c$ held in position by the thread of a screw, or the like. Preferably india-rubber stuffing, or the like, is provided between the cover plate and the cover or case as shown in the drawing by disk $h$. Against the inner surface rests a cone-shaped screw-spring $d$. This spring presses by means of a plate $e$, against the bottom of the milk-bottle $f$ and thereby presses the annular projection on the nipple $b$ against the rim of the neck-opening of the cover $a$. In this way there is effected a perfectly tight closing of this opening and consequently of the whole cover, and the bottle is further prevented from shaking about in the cover.

What I do claim as my invention, and desire to secure by Letters Patent, is:—

The combination of a nursing bottle and a nipple provided with a rim with a hollow strong cover provided with a rim and surrounding the bottle and having a removable bottom, and with a spring secured to the bottom, the bottle being held in a resilient and tight manner within the cover by the spring and by the rim of the nipple, the last being held upon the neck of the bottle by the rim of the cover as and for the purpose set forth.

In witness whereof I have hereunto set my hand in the presence of two witnesses.

FRIEDRICH OLTMANN JANSSEN.

Witnesses:
 FROON ESSING,
 FERDINAND REICH.